United States Patent
Kamai et al.

(10) Patent No.: US 12,479,091 B2
(45) Date of Patent: Nov. 25, 2025

(54) PICKING DEVICE, PICKING METHOD, AND PROGRAM

(71) Applicant: KONICA MINOLTA, INC., Tokyo (JP)

(72) Inventors: Yasuyuki Kamai, Tokyo (JP); Yusuke Murakami, Koganei (JP); Daichi Suzuki, Tachikawa (JP); Akihiro Nakamura, Tokyo (JP); Tomoyoshi Yukimoto, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 128 days.

(21) Appl. No.: 18/054,306

(22) Filed: Nov. 10, 2022

(65) Prior Publication Data

US 2023/0182289 A1 Jun. 15, 2023

(30) Foreign Application Priority Data

Dec. 15, 2021 (JP) ................................ 2021-203557

(51) Int. Cl.
*B25J 9/16* (2006.01)
*B25J 13/08* (2006.01)

(52) U.S. Cl.
CPC ........... *B25J 9/1612* (2013.01); *B25J 9/1635* (2013.01); *B25J 13/081* (2013.01)

(58) Field of Classification Search
CPC ...... B25J 9/1612; B25J 9/1635; B25J 13/081; B25J 19/023; B25J 9/1697;
(Continued)

(56) References Cited

U.S. PATENT DOCUMENTS

| | | | |
|---|---|---|---|
| 2007/0177790 A1* | 8/2007 | Ban | B25J 9/1697 382/153 |
| 2008/0181485 A1* | 7/2008 | Beis | B25J 9/1697 382/209 |

(Continued)

FOREIGN PATENT DOCUMENTS

| | | | |
|---|---|---|---|
| JP | H10118976 A | | 5/1998 |
| JP | 2017185607 A | * | 10/2017 |

(Continued)

OTHER PUBLICATIONS

Office Action (Notice of Reasons for Refusal) issued on May 27, 2025, by the Japanese Patent Office in corresponding Japanese Patent Application No. 2021-203557, and an English Translation of the Office Action. (16 pages).

(Continued)

*Primary Examiner* — B M M Hannan
(74) *Attorney, Agent, or Firm* — BUCHANAN INGERSOLL & ROONEY PC

(57) ABSTRACT

A picking device includes: a workpiece holder in which a plurality of workpieces is stacked; a light receiver that receives reflected light from a workpiece stacked in the workpiece holder; a mover that relatively moves the light receiver with respect to the workpiece in such a manner that a distance between the light receiver and the workpiece is adjustable; an arm that picks the workpiece; a first hardware processor that calculates a distance between the light receiver and at least one workpiece among the plurality of workpieces; a second hardware processor that specifies a workpiece as a picking target among the plurality of workpieces or a region where the workpiece exists; and a third hardware processor that adjusts a distance between the light receiver and the workpiece calculated by the first hardware (Continued)

processor by controlling the mover in the region specified by the second hardware processor.

12 Claims, 6 Drawing Sheets

(58) Field of Classification Search
CPC ........... G05B 2219/40053; G05B 2219/40584; G05B 2219/37555; G05B 2219/45063
USPC .......................................................... 700/245
See application file for complete search history.

(56) References Cited

U.S. PATENT DOCUMENTS

| | | | | |
|---|---|---|---|---|
| 2013/0158947 | A1* | 6/2013 | Suzuki | G01B 11/00 702/155 |
| 2018/0333857 | A1* | 11/2018 | Ando | B25J 9/1694 |
| 2021/0064868 | A1* | 3/2021 | Dearing | G01B 11/00 |
| 2021/0229275 | A1* | 7/2021 | Komaike | B25J 9/1697 |
| 2022/0297292 | A1* | 9/2022 | Nishina | B25J 9/1697 |
| 2022/0318942 | A1* | 10/2022 | Oda | B25J 9/163 |
| 2023/0070495 | A1* | 3/2023 | Lertkultanon | B25J 9/1697 |
| 2023/0182289 | A1* | 6/2023 | Kamai | B25J 13/081 700/245 |

FOREIGN PATENT DOCUMENTS

| | | |
|---|---|---|
| JP | 2019063955 A | 4/2019 |
| JP | 2021-013996 A | 2/2021 |

OTHER PUBLICATIONS

Office Action (Notice of Reasons for Refusal) issued Oct. 21, 2025, by the Japan Patent Office in corresponding Japanese Patent Application No. 2021-203557 and an English translation of the Office Action. (15 pages).

* cited by examiner

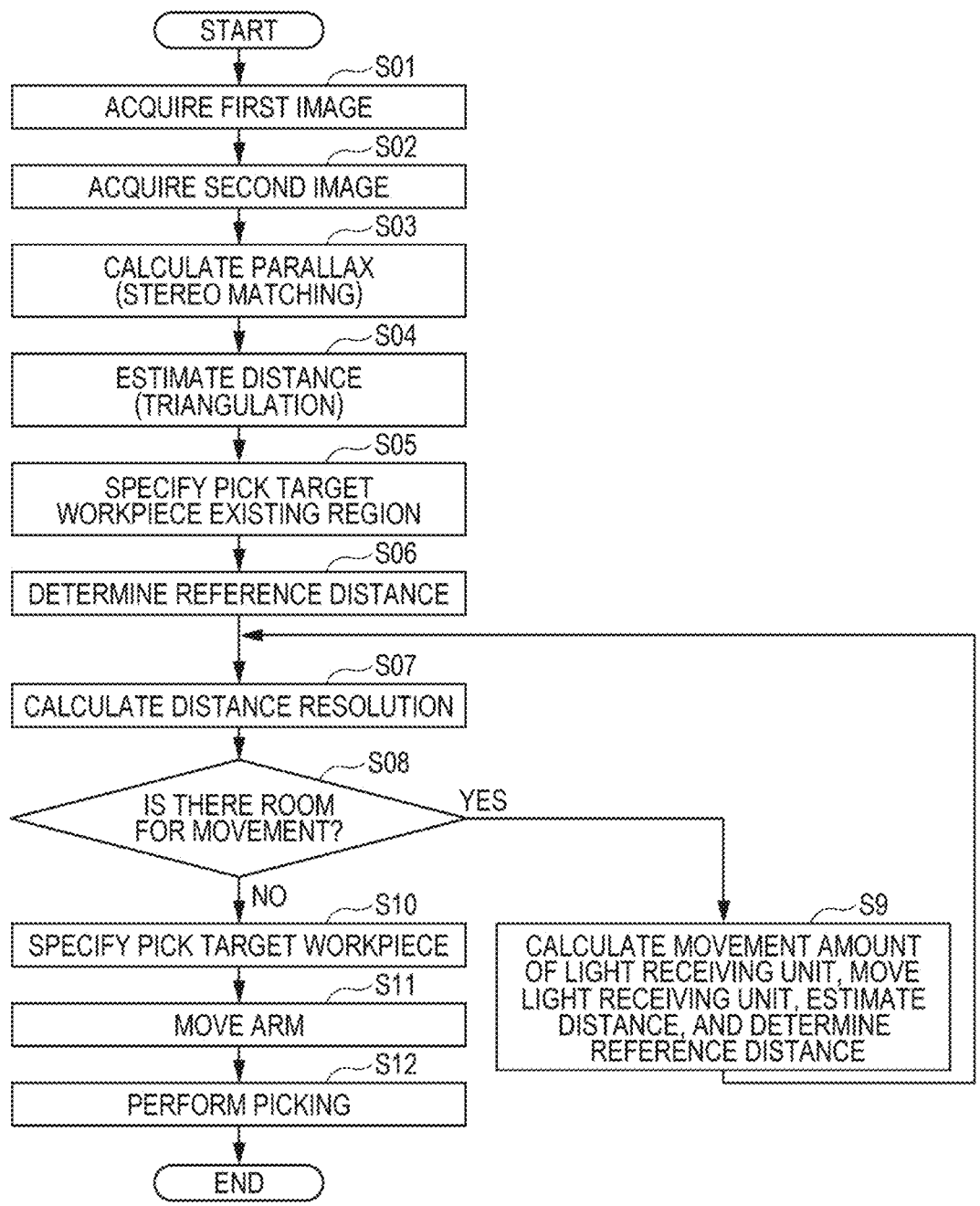

EXAMPLE OF WORKPIECE SIZE > ΔZ

EXAMPLE OF WORKPIECE SIZE < ΔZ

PICKING DEVICE, PICKING METHOD, AND PROGRAM

The entire disclosure of Japanese patent Application No. 2021-203557, filed on Dec. 15, 2021, is incorporated herein by reference in its entirety.

BACKGROUND

Technological Field

The present invention relates to a picking device, a picking method, and a program for picking a workpiece as a picking target from a plurality of workpieces stacked on a workpiece holder.

Description of the Related Art

For example, a picking device that recognizes a plurality of workpieces stacked in a container or the like in a space by a distance measuring unit based on a principle of triangulation such as a stereo camera and picks a recognized workpiece by a robot arm has been conventionally known.

In such a picking device, when the distance from the stereo camera or the like to the workpiece is long, a distance resolution decreases, and there is a problem that it is difficult to accurately recognize the distance to the workpiece.

Accordingly, JP 2017-185607 A discloses a picking device that maintains a resolution related to measurement by moving a support base that supports a container in which workpieces are stacked in bulk or a sensor and appropriately keeping a distance between the sensor and the workpieces.

It is described that, in the picking device of JP 2017-185607 A, the distance to the sensor is kept constant with respect to the uppermost workpiece, and the constant distance is a distance by which the entire container upper surface can be image-captured.

However, although there are workpieces under various conditions in an actual picking scene, the following problems remain when the distance is always kept constant under the conditions in the description of the prior art.

That is, if the size, mass, and shape of the workpiece as a picking target are different or the state of how the workpiece is stacked is different, it is not always possible to perform appropriate control even when the distance is adjusted to the constant distance with respect to the uppermost workpiece.

For example, even in a situation in which workpieces having the same shape are stacked in a bulk state, the stacking surface will have an irregular shape, but in a state in which plural workpieces overlap each other within the range of a convex portion surface close to the sensor and picking cannot be performed, it is necessary to prioritize a workpiece that is pickable and present within the range of a concave portion surface.

In addition, in a situation where different types of workpieces are mixed and stacked in bulk, in a case where the order of picking is determined, a workpiece with a higher order is not necessarily present at the top, and control for keeping the distance to the uppermost workpiece constant is not appropriate.

Furthermore, in JP 2017-185607 A, the constant distance is set as a range in which the entire top surface of the container can be image-captured, but in a case where the size of the workpiece changes and becomes smaller, accuracy of picking is further required, and thus the appropriate distance fluctuates. In this case, it is necessary to bring the distance close to a distance at which an appropriate resolution can be obtained in consideration of the size of the workpiece, but this point is not taken into consideration.

SUMMARY

The present invention has been made in view of such a technical background, and an object thereof is to provide a picking device, a picking method, and a program that can perform appropriate alignment with a workpiece that is pickable or that needs to be picked even if the workpiece is not the uppermost workpiece, and can accurately pick a necessary workpiece.

To achieve the abovementioned object, according to an aspect of the present invention, a picking device reflecting one aspect of the present invention comprises: a workpiece holder in which a plurality of workpieces is stacked; a light receiver that receives reflected light from a workpiece stacked in the workpiece holder; a mover that relatively moves the light receiver with respect to the workpiece in such a manner that a distance between the light receiver and the workpiece is adjustable; an arm that picks the workpiece; a first hardware processor that calculates a distance between the light receiver and at least one workpiece among the plurality of workpieces; a second hardware processor that specifies a workpiece as a picking target among the plurality of workpieces or a region where the workpiece exists; and a third hardware processor that adjusts a distance between the light receiver and the workpiece calculated by the first hardware processor by controlling the mover in the region specified by the second hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3 is a flowchart illustrating an operation of the picking device;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
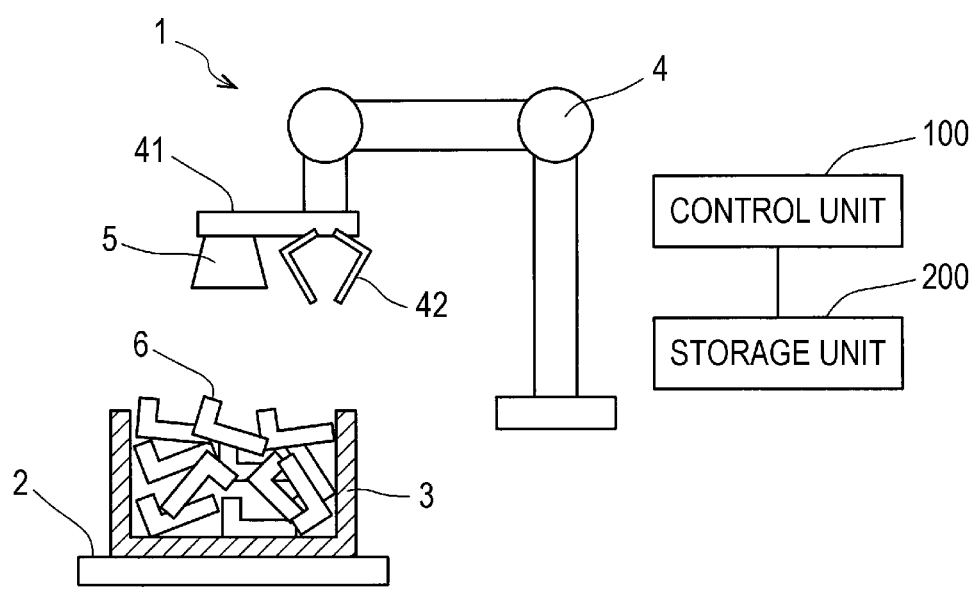
FIG. 1 is a schematic configuration diagram of a picking device according to an embodiment of the present invention.

FIG. 1 is a schematic configuration diagram of a picking device 1 according to an embodiment of the present invention. In FIG. 1, a picking device 1 includes a support base 2, a container 3 as a box-shaped workpiece holder arranged on the support base 2 and having an open upper surface, and a movable robot arm unit 4.

A hand unit 42 for gripping and picking a plurality of workpieces 6 (workpiece group) stacked in the container 3 is attached to a horizontal support unit 41 at a distal end of the robot arm unit 4, and a light receiving unit 5 is attached downward to a side position of the hand unit 42. The robot arm unit 4 can move in vertical and horizontal directions.

The light receiving unit 5 includes a stereo camera which is an imaging sensor that receives reflected light from the workpiece group in the container, and captures a stereo image. Since the light receiving unit 5 is provided integrally with the robot arm unit 4, when the robot arm unit 4 moves in the vertical and horizontal directions, the light receiving unit 5 and the hand unit 42 move together with the robot arm unit 4. That is, the robot arm unit 4 functions as a mover that moves the light receiving unit 5.

However, the light receiving unit 5 may be configured independently of the robot arm unit 4, and may be configured to be movable in the vertical direction or the like independently of the robot arm unit 4.

Further, the picking device 1 includes a control unit 100 and a storage unit 200. The control unit 100 integrally controls the entire picking device 1 as described below. The storage unit 200 is, for example, a storage device such as a hard disk drive (HDD), a solid state drive (SSD), or a flash memory. The storage unit 200 stores various data and programs. In the present embodiment, the size (vertical, horizontal, height, or the like) of a workpiece 6 is further stored.

Figure 2:
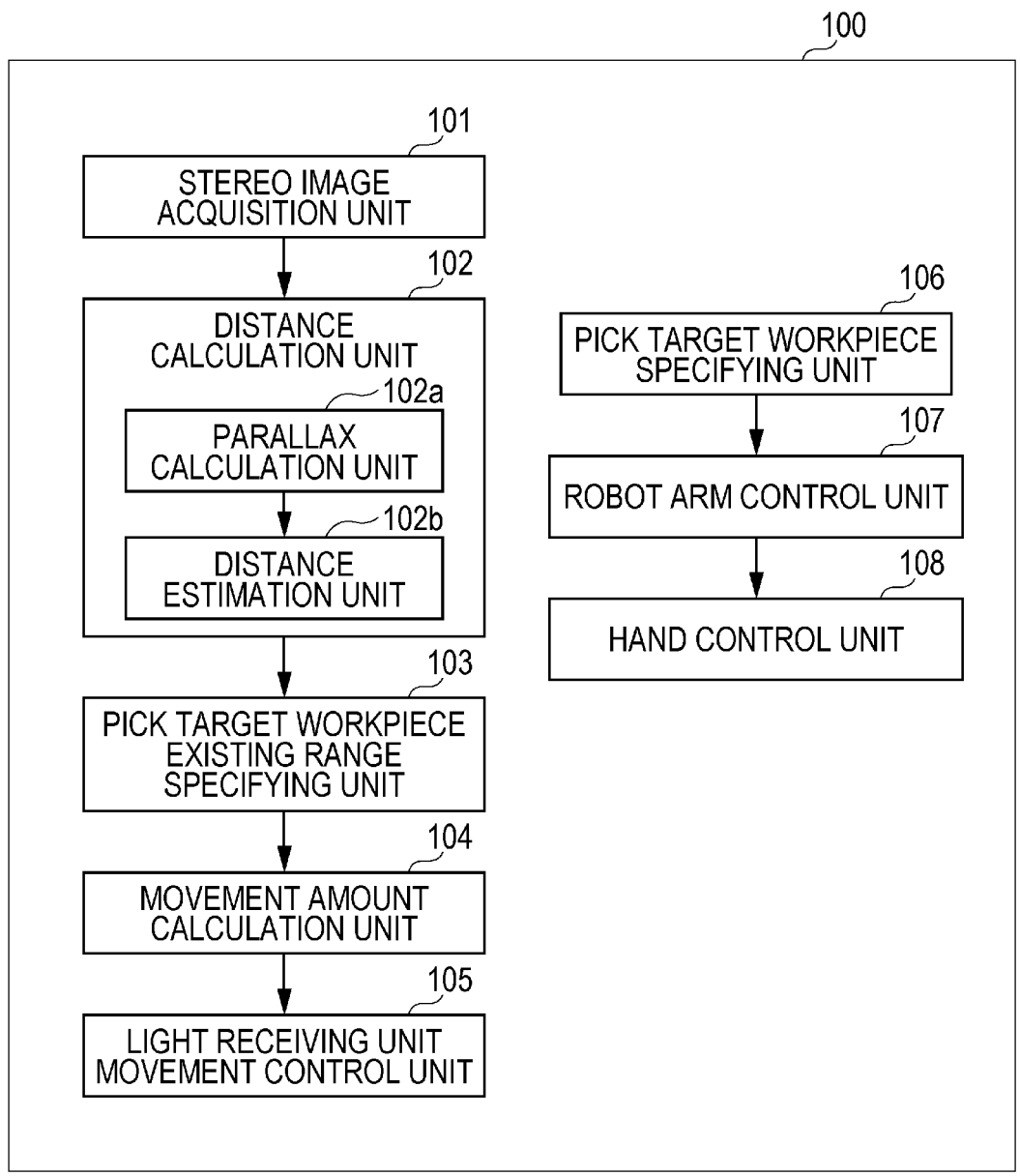
FIG. 2 is a block diagram illustrating a functional configuration of a control unit in the picking device.

FIG. 2 is a block diagram illustrating a functional configuration of the control unit 100 in the picking device 1.

The control unit 100 is implemented by a processor such as a central processing unit (CPU) executing a program stored in the storage unit 200 or the like. Note that the control unit 100 may be achieved by hardware such as a large scale integration (LSI) having a function similar to that of a processor executing a program and an application specific integrated circuit (ASIC).

The control unit 100 functionally includes a stereo image acquisition unit 101, a distance calculation unit 102, a picking (also referred to as a pick) target workpiece existing range specifying unit 103, a movement amount calculation unit 104, a light receiving unit movement control unit 105, a pick target workpiece specifying unit 106, a robot arm control unit 107, and a hand control unit 108.

The stereo image acquisition unit 101 acquires two stereo images from the stereo camera of the light receiving unit 5.

The distance calculation unit 102 calculates a distance from the light receiving unit 5 to the workpiece 6 on the basis of the acquired stereo images. The distance calculation unit 102 includes a parallax calculation unit 102a that calculates a parallax of the two stereo images and a distance estimation unit 102b that estimates a distance on the basis of the calculated parallax.

The pick target workpiece existing range specifying unit 103 specifies a region where the workpiece 6 as a pick target exists among the plurality of workpieces 6 stacked in the container 3.

The movement amount calculation unit 104 calculates a movement amount of the light receiving unit 5 with respect to the range specified by the pick target workpiece existing range specifying unit 103, and the light receiving unit movement control unit 105 causes the light receiving unit 5 to move via the robot arm unit 4 so that the movement amount becomes the calculated movement amount.

The pick target workpiece specifying unit 106 specifies a workpiece as a pick target from the range specified by the pick target workpiece existing range specifying unit 103, the robot arm control unit 107 moves the robot arm unit 4 to the specified pick target workpiece, and the hand control unit 108 grips and picks the specified pick target workpiece by the hand unit 42.

FIG. 3 is a flowchart illustrating an operation of the picking device 1. This operation is executed by a CPU which is not illustrated of the control unit 100 operating according to an operation program stored in the storage unit 200 or the like.

In step S01, a first image (for example, an image of a left camera) is acquired, and in step S02, a second image (for example, an image of a right camera) is acquired. The first image and the second image are not limited to those obtained by a compound-eye camera, and may be obtained by moving the monocular single camera.

Next, after the parallax between the first image and the second image is calculated in step S03, the distance between the light receiving unit 5 and the workpiece 6 is estimated by the principle of triangulation in step S04 (first calculation processing). The calculation of the parallax and the estimation of the distance are performed as follows.

That is, as a method of calculating the parallax for each pixel in a stereo camera, a block matching method of feature points, a semi-global matching (SGM) propagation method, and the like are known. These methods are a method that calculates a matching degree for each parallax when feature points of left and right images are searched for, and a parallax value d giving a minimum error in a search parallax space is calculated.

Here, in the calculation of the matching degree, the image is divided into predetermined N×M small regions, and one image is searched for a corresponding point in the other image, so that a portion having the highest matching degree is set as the corresponding point. This is performed by processing such as calculating a sum of absolute values of differences in luminance values over the entire image while shifting pixel positions to be compared. The depth (distance) Z is calculated on the basis of the parallax d, an inter-camera distance B, and a focal length F. The distance corresponding to each pixel is calculated by a correspondence expression of Z (Z=BF/d).

In this method, it is difficult to secure the distance resolution in a far region having the small parallax (that is, large distance Z). There is a tendency that a variation (variance) of a parallax calculation result is large and a variation of a distance measurement value is also large.

In the present embodiment, the stereo camera is described as an example, but a measurement unit that is theoretically the same such as a pattern irradiation method may be used.

Next, in step S05, an existing region of the pick target workpiece 6 is specified. This specification is performed, for example, as follows. That is, on the basis of information (in a case of the stereo camera, left and right two-dimensional (2D) images of the group of workpieces 6) obtained from the light receiving unit 5 and information of a distance in a depth direction corresponding to the information, existence of a pickable workpiece 6 and a region (X, Y) thereof on the 2D image are specified.

When the manner of stacking the group of workpieces 6 is different, proper control is not necessarily performed even if the light receiving unit 5 is adjusted to a distance in a predetermined range with respect to the uppermost workpiece 6.

Figure 4A:
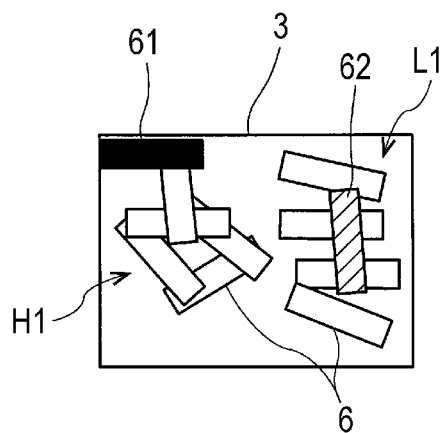
FIG. 4A is a top view schematically illustrating a stacked state of workpieces.
Figure 4B:
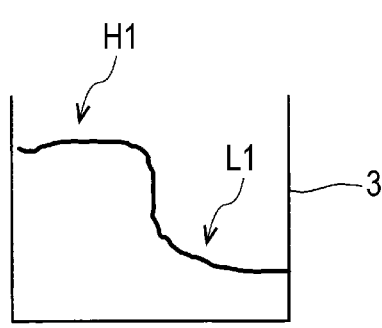
FIG. 4B is a side view of the workpieces.

For example, as illustrated in a schematic top view of FIG. 4A, even in a situation where the workpieces 6 having the same shape are stacked in a bulk state, as illustrated in a schematic side view of FIG. 4B, the stacking surface on the upper portion has an irregular shape, but the plurality of workpieces 6 overlaps each other within a range of a convex portion H1 close to the light receiving unit 5 and cannot be picked. In this state, it is desirable to prioritize the pickable workpiece 6 existing within the range of the concave portion L1. In the example of FIGS. 4A and 4B, although the workpiece 61 indicated by black is present at the uppermost position, it cannot be picked, and thus a workpiece 62 indicated by hatching is the pick target.

Figure 5A:
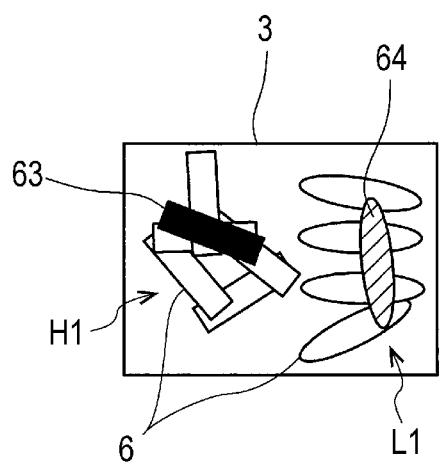
FIG. 5A is a top view schematically illustrating another stacking state of the workpieces.
Figure 5B:
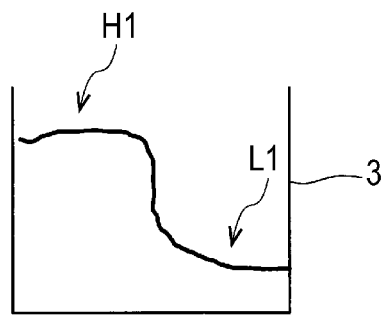
FIG. 5B is a side view of the workpieces.

Further, in a situation where different types of workpieces 6 are mixed and stacked in bulk, the picking order may be determined. In this case, control for keeping the distance to the light receiving unit 5 within a predetermined range for the uppermost workpiece 6 is not necessarily appropriate. As illustrated in a schematic top view of FIG. 5A and a schematic side view of FIG. 5B, a quadrangular first workpiece 63 is within the range of the convex portion H1, an elliptical second workpiece 64 is within the range of the concave portion L1, and an uppermost component is the first component 63. However, in a case where the second workpiece 64 has to be supplied first as the picking order, the second workpiece 64 is the pick target.

Thus, the region where the workpiece 6 that is pickable or needs to be picked exists is specified, and the region is specified in order to control the distance to the light receiving unit 5 within a predetermined range with respect to the region. Specifically, on the basis of the 2D image and the depth information described above, the shape of the workpiece 6 is extracted from the group of workpieces 6, and a region where a workpiece 6 in position and orientation not overlapping other workpieces and allowing picking is present is specified from a plurality of workpiece regions. The workpiece 6 itself may be specified. As a specific method, there is a method of determining a region with the highest reliability from the calculated score using three-dimensional (3D) template matching or the like.

However, for example, in a case where it can be determined that, from the left and right two-dimensional (2D) images of the group of workpieces 6, there is a workpiece 6 in position and orientation not overlapping other workpieces and allowing picking also from the arrangement, the workpiece 6 as a picking target may be specified without acquiring information of the distance in the depth direction. In this case, after the workpiece 6 is specified, it is only required to calculate the distance between the workpiece 6 and the light receiving unit 5. Of course, the distance in step S04 in FIG. 3 may be calculated before the identification.

Returning to FIG. 3, next, a reference distance is determined in step S06. On an upper stacking surface of the stacked group of workpieces 6, irregularities usually exist, and the distance between the light receiving unit 5 and the workpiece 6 varies depending on the positions of the irregularities. In step S06, it is determined which portion of the irregularities of the stacking surface within the range specified in step S05 a measurement distance is determined with reference to.

Figure 6:
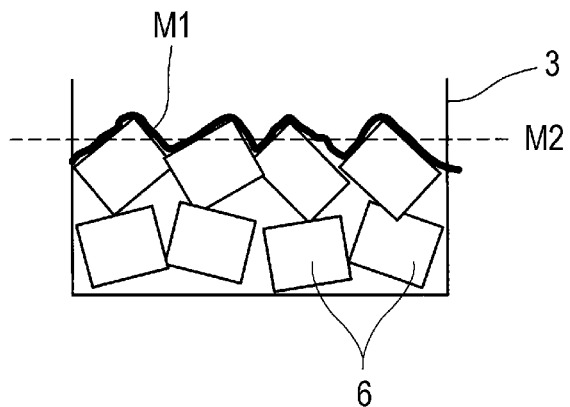
FIG. 6 is a schematic side view illustrating one method of determining a reference distance.

As one method, as illustrated in FIG. 6, a method can be exemplified in which an average value of distances to the light receiving unit 5 at respective positions of a stacking surface M1 is used as the reference distance. In FIG. 6, a reference sign M2 denotes a reference plane defining the reference distance.

Figure 7:
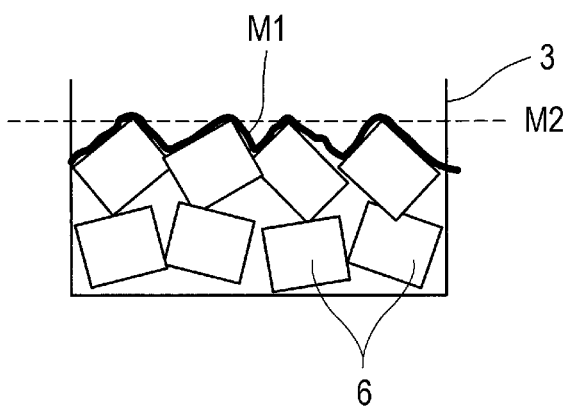
FIG. 7 is a schematic side view illustrating another method of determining the reference distance.

As another method, as illustrated in FIG. 7, a method can be exemplified in which the minimum value of the distance to the light receiving unit 5 at the uppermost position of the stacking surface M1, that is, the distance between the light receiving unit 5 and the respective positions of the stacking surface M1 is set as the reference distance. In this case, a horizontal plane passing through the uppermost part of the stacking surface M1 is the reference plane M2.

Figure 8A:
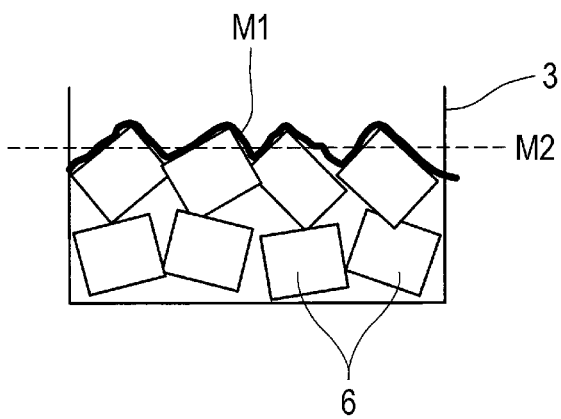
FIG. 8A is a schematic side view illustrating still another method of determining the reference distance.
Figure 8B:
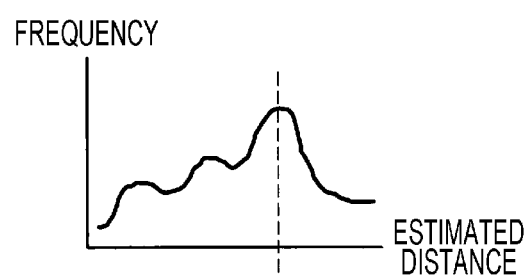
FIG. 8B is a histogram illustrating the frequency of a distance between a light receiver and each position of the stacking surface.

As still another method, a method can be exemplified in which, among the distances between the light receiving unit 5 and the respective positions of the stacking surface M1 illustrated in FIG. 8A, a mode value, that is, a most frequent value in a histogram indicating a frequency of the distance between the light receiving unit 5 and the respective positions of the stacking surface M1 illustrated in FIG. 8B is used as the reference distance.

In addition, a partial region in the region specified in step S05 or a distance between a part of the workpiece 6 and the light receiving unit 5 may be used as the reference distance. In a case where one workpiece as the pick target is specified in step S05, the distance between the workpiece 6 and the light receiving unit 5 is only required be used as the reference distance.

Next, in step S07 in FIG. 3, the distance resolution is calculated.

When the calculated distance at the time of image-capturing at the predetermined position is known, the depth of the parallax ±1 LSB can be estimated. This difference is a reference resolution. For example, assuming that the parallax is D, a base line is B, the focal length is F, and a pixel size is P, the estimated distance Z is obtained by Z=(F*B)/(D*P).

When the parallax D is changed by the amount of the minimum resolution (±1 LSB) of the disparity D at the time of obtaining the distance Z, the difference from the original Z is obtained as an estimation error ΔZ.

$$Zdp=(F*B)/((D+1\ LSB)*P)$$

$$\Delta Z=Z-Zdp$$

Figure 9A:
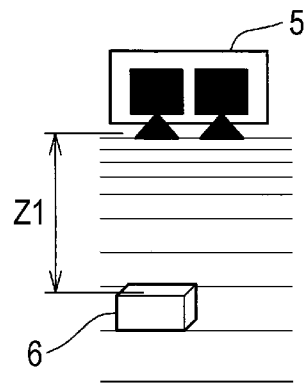
FIG. 9A is a view schematically illustrating a state of a distance between the light receiver and a workpiece before movement.
Figure 9B:
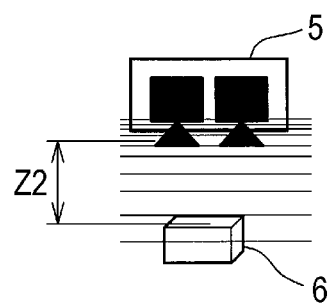
FIG. 9B is a view schematically illustrating a state of the distance between the light receiver and the workpiece after movement.

Next, in step S08, it is determined whether there is room for movement to the parallax D (the direction in which the resolution is higher) in which ΔZ becomes smaller. If it can be determined that there is room (YES in step S08), the process proceeds to step S09, and the light receiving unit 5 is moved downward within a range in which a target resolution can be obtained by calculating the movement amount of the light receiving unit 5, and the distance between the light receiving unit 5 and the workpiece 6 is adjusted. FIG. 9A schematically illustrates a state of the distance between the light receiving unit 5 and the workpiece 6 before the movement, and FIG. 9B schematically illustrates a state after the movement. In the drawings, horizontal lines indicate steps of resolution.

For example, in a case where the parallax D at the time of calculating the distance between the light receiving unit 5 and the workpiece 6 is at a position of 50% (64/128) of the maximum, if the measurement can be performed at a distance at which the parallax D becomes 128, the measurement is performed in a range in which the resolution is the minimum, and thus the determination is made according to the obtained $\Delta Z$.

In a case of bulk workpieces, since the workpiece surface is lowered as the workpiece is picked, if the optimum distance can be calculated once, the amount equivalent to the lowering thereafter may be set as the movement amount.

After the movement, the distance between the light receiving unit 5 and the workpiece 6 is estimated again in step S09 similarly to step S04 (second calculation processing), the reference distance is determined similarly to step S4, and the processing returns to step S07. In step S07, the distance resolution is calculated again, and in step S08, it is determined whether there is room for movement to the parallax D in which $\Delta Z$ becomes smaller (a direction in which the resolution is higher). If there is room (YES in step S08), step S09, step S07, and step S08 are desirably repeated until there is no room. That is, after the distance between the light receiving unit 5 and the workpiece 6 is calculated by the first calculation processing in step S04, the movement of the light receiving unit 5 and the recalculation of the distance between the light receiving unit 5 and the workpiece 6 in step S09 are repeated once or twice or more, so that the position of the light receiving unit 5 with higher accuracy can be specified, and the distance can be measured at the target $\Delta Z$.

Figure 10A:
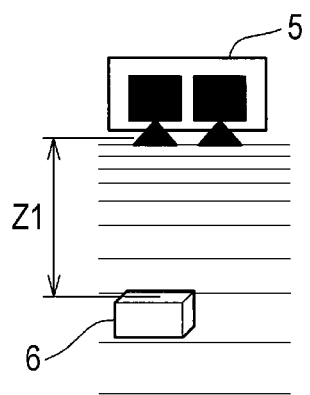
FIG. 10A is a view schematically illustrating a state of the distance between the light receiver and the workpiece before movement.
Figure 10B:
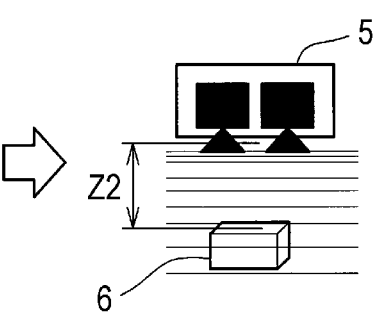
FIG. 10B is a view schematically illustrating a state of the distance between the light receiver and the workpiece after movement.
Figure 10C:
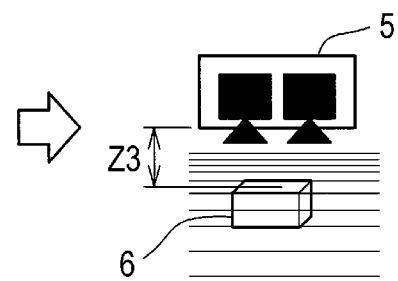
FIG. 10C is a view schematically illustrating a state of the distance between the light receiver and the workpiece after further movement.

For example, as illustrated in FIG. 10A, $\Delta Z1$ is measured on the basis of a calculation result of the distance by the first calculation processing, and on the basis of the result, as illustrated in FIG. 10B, after movement adjustment to the target $\Delta Z2$, distance calculation by the second calculation processing is performed, and $\Delta Z3$ is further obtained from a calculation result. At this time, it is determined whether there is a difference in the range of the target parallax. If there is a difference, it is determined that more detailed decomposition can be performed, and on the basis of this result, the movement of the light receiving unit 5 and the second calculation processing are performed again as illustrated in FIG. 10C.

Figure 11A:
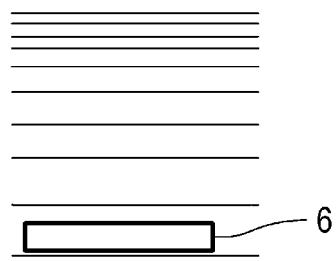
FIG. 11A is a view schematically illustrating a state of the distance between the light receiver and the workpiece before movement.
Figure 11B:
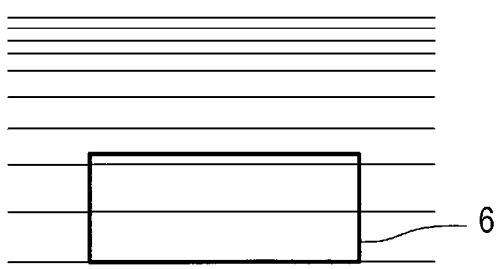
FIG. 11B is a view schematically illustrating a state of the distance between the light receiver and the workpiece after movement.

Further, in a case where the shape and size of the pick target workpiece 6 are known in advance, measurement with the maximum resolution is not necessarily required as long as the resolution range is sufficient with respect to the minimum size among the length, width, and height of the workpiece 6, and thus, in this case, the distance is calculated at a position where the resolution is sufficient with respect to the minimum size of the workpiece, in other words, at a position where the minimum size of the workpiece<the distance resolution. Since $\Delta Z$ is small with respect to the size of the workpiece 6, the possibility of a picking failure is increased in FIG. 11A, but on the other hand, in a case where a plurality of resolutions is provided with respect to the size as illustrated in FIG. 11B, the possibility of a picking failure is reduced.

In step S08 of FIG. 3, if there is no room for movement to the parallax D (the direction in which the resolution is higher) in which $\Delta Z$ becomes smaller (NO in step S08), the process proceeds to step S10.

In step S10, the pick target workpiece 6 is specified on the basis of the image by the light receiving unit 5 located at an appropriate distance with respect to the workpiece 6, then in step S11, the robot arm unit 4 is moved, and in step 12, the workpiece 6 is picked using the hand unit 42. The specification of the pick target workpiece 6 is performed by registering a CAD model of the pick component in advance and performing model fitting from the acquired image. In general, the position and orientation of the component are specified by two-dimensional template matching in a case of flat stacking, and by three-dimensional template matching in a case of bulk stacking. These pieces of information are finally converted into a coordinate system (x, y, z, Rx, Ry, Rz) of the robot, and a picking instruction is output. Note that, since these picking operations are known, detailed description thereof will be omitted.

After picking one workpiece 6, steps S01 to S12 are repeated to pick a plurality of workpieces 6 one by one.

As described above, in this embodiment, the distance between the light receiving unit 5 and the workpiece 6 is calculated, and the region where the workpiece 6 as a picking target exists among the plurality of workpieces 6 is specified on the basis of the information obtained by the light receiving unit 5 and the calculated distance. When the measured distance between the light receiving unit 5 and the workpiece 6 is not within the predetermined range in the specified region, the distance is adjusted by moving the light receiving unit 5 in the vertical direction with respect to the workpiece 6 so as to be within the predetermined range. Thus, even if the workpiece is not the uppermost workpiece, the light receiving unit 5 can be appropriately aligned with respect to the workpiece that can be picked or needs to be picked in the specified region, and the workpiece 6 can be picked more accurately by the robot arm unit 4.

Although one embodiment of the present invention has been described above, the present invention is not limited to the above embodiment.

For example, although the workpiece 6 is stacked and stored in the container 3, the workpiece may be directly stacked on the support base 2 using the support base 2 as a workpiece holder.

In addition, although the configuration in which the light receiving unit 5 is moved in the vertical direction has been described, the support base 2 or the container 3 may be moved up and down, or both the light receiving unit 5 and the support base 2 or the container 3 may be moved. In short, it is sufficient if the light receiving unit 5 relatively moves with respect to the workpiece 6 in such a manner that the distance between the light receiving unit 5 and the workpiece 6 is adjustable.

According to an embodiment of the present invention, with the program according to the present invention, it is possible to cause a computer of a picking device to execute processing of measuring a distance between the light receiver and at least one workpiece among a plurality of workpieces, specifying a workpiece as a picking target among the plurality of workpieces or a region where the workpiece exists, and adjusting a distance between the light receiver and the workpiece calculated in the calculating in the specified region.

Although embodiments of the present invention have been described and illustrated in detail, the disclosed embodiments are made for purposes of illustration and example only and not limitation. The scope of the present invention should be interpreted by terms of the appended claims.

What is claimed is:

1. A picking device, comprising:
    a workpiece holder in which a plurality of workpieces is stacked;
    a light receiver that receives reflected light from a workpiece stacked in the workpiece holder;
    a mover that relatively moves the light receiver with respect to the workpiece in such a manner that a distance between the light receiver and the workpiece is adjustable;
    an arm that picks the workpiece;
    a hardware processor, wherein the hardware processor is configured to perform elements (i)-(vi) to pick a pick target workpiece:
    (i) acquire, by the light receiver, a first image of the plurality of workpieces stacked in the workpiece holder,
    (ii) calculate a first distance between the light receiver and the pick target workpiece,
    (iii) move, by the mover, the light receiver on a basis of the acquired first image to make the distance between the pick target workpiece and the light receiver a predetermined distance,
    (iv) calculate a final distance between the light receiver and the pick target workpiece after the movement,
    (v) specify the pick target workpiece after the calculation of the final distance on a basis of a subsequent image of the pick target workpiece obtained by the light receiver after the movement, and
    (vi) pick, by the arm, the specified pick target workpiece.

2. The picking device according to claim 1, wherein the hardware processor specifies a region where a workpiece as a picking target exists on a basis of information obtained by the light receiver and the distance calculated by the hardware processor.

3. The picking device according to claim 1, wherein the light receiver is installed in the arm and moves together with the arm.

4. The picking device according to claim 1, wherein
    when the calculation of the first distance between the light receiver and the workpiece by the hardware processor is first calculation processing,
    after the movement of the light receiver, the hardware processor executes second calculation processing of calculating the distance between the light receiver and the workpiece again, and
    calculates the final distance between the light receiver and the workpiece on a basis of the distance calculated by the second calculation processing.

5. The picking device according to claim 4, wherein the hardware processor repeats the second calculation processing after the movement of the light receiver once or twice or more.

6. The picking device according to claim 1, wherein the hardware processor calculates the distance between the light receiver and the workpiece within a range in which the distance between the light receiver and the workpiece satisfies that a minimum size of the workpiece is less than a distance resolution.

7. The picking device according to claim 1, wherein the distance calculated by the hardware processor is an average value of distances between each part of a stacking surface and the light receiver different from each other due to a shape of the stacking surface of the workpieces.

8. The picking device according to claim 1, wherein the distance calculated by the hardware processor is a minimum value among distances between each part of a stacking surface and the light receiver different from each other due to a shape of the stacking surface of the workpieces.

9. The picking device according to claim 1, wherein the distance calculated by the hardware processor is a mode value among distances between each part of a stacking surface and the light receiver different from each other due to a shape of the stacking surface of the workpieces.

10. The picking device according to claim 1, wherein the distance calculated by the hardware processor is a distance between a partial region of a stacking surface of the workpieces and the light receiver.

11. A picking method by a picking device including
    a workpiece holder in which a plurality of workpieces is stacked,
    a light receiver that receives light reflected from a workpiece stacked in the workpiece holder,
    a mover that relatively moves the light receiver with respect to the workpiece in such a manner that a distance between the light receiver and the workpiece is adjustable, and
    an arm that picks the workpiece,
    the picking method comprising, by the picking device to pick a pick target workpiece:
    (i) acquiring, by the light receiver, a first image of the plurality of workpieces stacked in the workpiece holder,
    (ii) calculating a first distance between the light receiver and the pick target workpiece,
    (iii) moving, by the mover, the light receiver on a basis of the acquired first image to make the distance between the pick target workpiece and the light receiver a predetermined distance,
    (iv) calculating a final distance between the light receiver and the pick target workpiece after the movement,
    (v) specifying the pick target workpiece after the calculation of the final distance on a basis of a subsequent image of the pick target workpiece obtained by the light receiver after the movement, and
    (vi) picking, by the arm, the specified pick target workpiece.

12. A non-transitory recording medium storing a computer readable program causing a computer of a picking device including
    a workpiece holder in which a plurality of workpieces is stacked,
    a light receiver that receives light reflected from a workpiece stacked in the workpiece holder,
    a mover that relatively moves the light receiver with respect to the workpiece in such a manner that a distance between the light receiver and the workpiece is adjustable, and
    an arm that picks the workpiece, to execute elements (i)-(vi) to pick a pick target workpiece:
    (i) acquiring, by the light receiver, a first image of the plurality of workpieces stacked in the workpiece holder,
    (ii) calculating a first distance between the light receiver and the pick target workpiece, (iii) moving, by the mover, the light receiver on a basis of the acquired first image to make the distance between the pick target workpiece and the light receiver a predetermined distance,
(iv) calculating a final distance between the light receiver and the pick target workpiece after the movement,
(v) specifying the pick target workpiece after the calculation of the final distance on a basis of a subsequent image of the pick target workpiece obtained by the light receiver after the movement, and
(vi) picking, by the arm, the specified pick target workpiece.

\* \* \* \* \*